H. E. WILLIAMS.
BEARING.
APPLICATION FILED JUNE 1, 1912.
1,138,822.
Patented May 11, 1915.
2 SHEETS—SHEET 1.
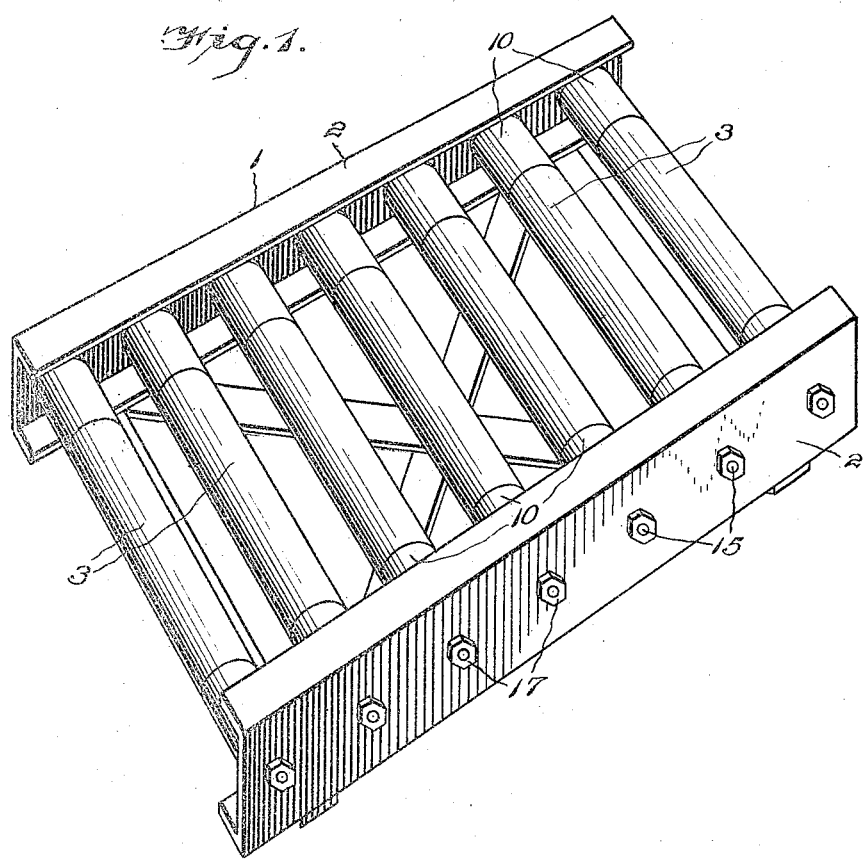
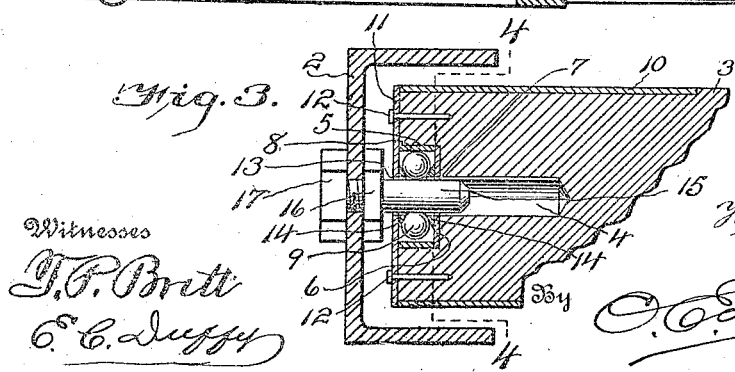
Inventor
Harry E. Williams

H. E. WILLIAMS.
BEARING.
APPLICATION FILED JUNE 1, 1912.

1,138,822.

Patented May 11, 1915.
2 SHEETS—SHEET 2.

Witnesses
T. P. Britt
E. C. Dussy

Inventor
Harry E. Williams

By O. C. Duppe
Attorneys

UNITED STATES PATENT OFFICE.

HARRY E. WILLIAMS, OF LOUISVILLE, KENTUCKY, ASSIGNOR TO DOW WIRE & IRON WORKS, OF LOUISVILLE, KENTUCKY, A CORPORATION.

BEARING.

1,138,822.  Specification of Letters Patent.  Patented May 11, 1915.

Application filed June 1, 1912. Serial No. 701,067.

*To all whom it may concern:*

Be it known that I, HARRY E. WILLIAMS, a citizen of the United States, residing at Louisville, in the county of Jefferson and State of Kentucky, have invented certain new and useful Improvements in Bearings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to conveyers but more particularly to the bearings for mounting the rollers of the conveyer, and the invention has for its object to provide a novel bearing for the rollers of conveyers which is particularly simple in its construction, cheap and easy to assemble.

A further object of the invention is to provide a simple bearing practically frictionless which is mounted and entirely housed within the roller.

A further object of the invention is to provide a simple means for retaining the balls of the bearing against displacement.

With these objects in view the invention consists in the novel construction of the bearing and particularly in the arrangement of the retaining rings therein.

The invention also consists in certain other novel details of construction and in the combinations of parts, all of which will be first fully described and afterward specifically pointed out in the appended claim.

Figure 4:
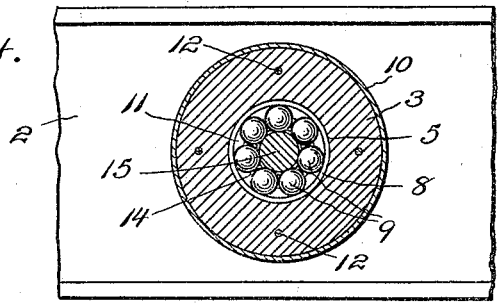
Figure 5:
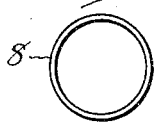
Figure 6:
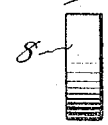
Figure 7:
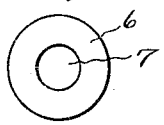
Figure 8:
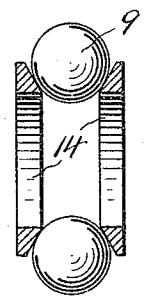
Figure 9:
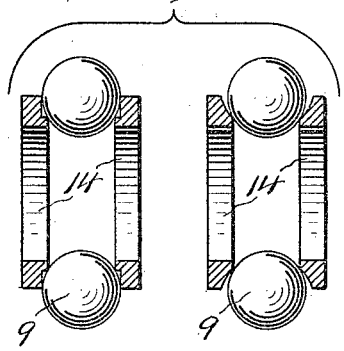
Figure 10:
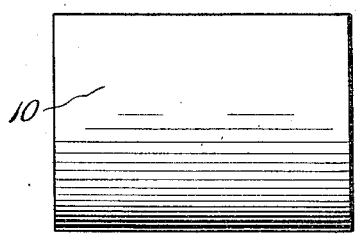

Referring to the accompanying drawings: Figure 1 is a perspective view of a section of a conveyer showing the conveyer rollers and illustrating the particular application of this invention. Fig. 2 is a transverse sectional view through the conveyer. Fig. 3 is an enlarged fragmentary transverse sectional view through one end of a roller and through the bearing. Fig. 4 is a vertical sectional view through the roller and bearing taken on line 4—4 of Fig. 3. Fig. 5 is a side elevation of the annular casing on which the balls rotate. Fig. 6 is a side elevation thereof. Fig. 7 is an elevation of the inner annular plate forming a portion of the bearing. Fig. 8 illustrates the retaining rings in vertical section. Fig. 9 illustrates modifications of the retaining rings, and Fig. 10 is an elevation of the ferrule on the ends of the rollers.

Like numerals of reference indicate the same parts throughout the several figures in which;

1 indicates a section of a conveyer having the longitudinal parallel channel frame 2 and the conveyer rollers 3 mounted therein in the manner as shown in Fig. 1.

The rollers 3 may be of any suitable material, the ends of which are recessed at 4 (Fig. 3) and are counter-recessed at 5. On the shoulder or surface formed by the counter-recess 5 in the end of the roller is arranged an annular plate 6, said annular plate 6 having a central opening 7 therein of a size substantially the same as that of the recess 4. Arranged in the bore of the counter-recess 5 is the annular casing 8 within which the balls 9 rotate.

10 indicates a ferrule which is placed on each end of each roller for the purpose of strengthening the same, and a covering plate 11 is arranged on the extreme ends of each roller and fastened to the roller as by means of nails 12 or any other suitable fastening, said plate 11 being large enough to entirely cover the end of the roller and to extend over the edge of the ferrule 10 to securely hold said ferrule in position on the roller, the plate 11 being provided with a central aperture 13 to agree with the recess 4 in the end of the roller. The annular plate 6, casing 8 and covering plate 11 form a race for the balls 9 as is clearly shown in Fig. 3, and arranged in said race on each side of the balls are the loose retaining rings 14, said retaining rings 14 being preferably beveled as shown in Fig. 8 but may have their ball engaging surfaces concaved and rabbeted as shown in Fig. 9.

Arranged in the channel frame pieces 2 are the axles 15 which extend transversely therefrom and which enter the recess 4 in each end of the rollers, the portion of the axle 15 within the bearing and in engagement with the balls being smooth to provide frictionless and quiet running, while the outer portion of the axle 15 is threaded into the channel frame pieces 2 and secured therein by means of the nuts 16 and 17 on each face of the channel frame pieces 2 as is clearly shown in Fig. 3. By this construction the axles 15 are very rigidly secured in their proper position and being of a relatively short length they are strong and capable of supporting great weight. By reason of the construction of the bearing proper as just described the rollers are rendered exceedingly strong and durable, as the bearings being arranged within the rollers take the weight nearer the point where it is applied than if the bearing was on the outside of the roller as is of course apparent. By reason of the loosely arranged retaining rings 14 the balls 9 cannot fall from their race when the roller is removed from its axles 2 as the retaining rings 14 being held in position by the plates 6 and 11 the balls are unable to pass between the rings in order to fall out of the race or bearing; consequently the rollers can be removed or the axles can be removed from the conveyer very quickly and they can be replaced without difficulty and without possibility of deranging the ball bearing or loosening the balls.

Having thus fully described the invention its operation is apparent from the foregoing description taken in connection with the accompanying drawings.

It is apparent that certain changes can be made in the construction and arrangement of the parts as described and I consider myself clearly entitled to all such changes and modifications as fall within the limit and scope of the appended claim.

What I claim as new and desire to secure by Letters Patent of the United States is:—

A device of the character described comprising a roller provided at both ends with a concentric recess extending into the roller and provided with a counter-recess, an annular plate arranged in said counter-recess, an annular casing in said counter-recess, a ferrule on each end of the roller, a face plate on each end of the roller, a series of balls arranged in the counter-recess in the roller, a plurality of loosely arranged ball retaining rings in said counter-recess to retain balls therein, and an axle entering said concentric recess at each end of the roller for engagement with the said balls in the said counter-recess, substantially as described and for the purposes set forth.

In testimony whereof, I affix my signature, in presence of two witnesses.

HARRY E. WILLIAMS.

Witnesses:
   C. MAE GOULD,
   T. P. BRITT.